United States Patent
Yasumoto (10) Patent No.: US 7,799,857 B2
(45) Date of Patent: Sep. 21, 2010

(54) FLAME-RETARDANT THERMOPLASTIC RESIN COMPOSITION, MOLDED PRODUCT THEREOF AND ELECTRIC WIRE

(75) Inventor: Kazuhisa Yasumoto, Kanagawa (JP)

(73) Assignee: Sun Allomer Ltd., Tokyo (JP)

( * ) Notice: Subject to any disclaimer, the term of this patent is extended or adjusted under 35 U.S.C. 154(b) by 14 days.

(21) Appl. No.: 11/914,859

(22) PCT Filed: Apr. 28, 2006

(86) PCT No.: PCT/JP2006/308939

§ 371 (c)(1),
(2), (4) Date: Nov. 19, 2007

(87) PCT Pub. No.: WO2006/123530

PCT Pub. Date: Nov. 23, 2006

(65) Prior Publication Data

US 2009/0030130 A1    Jan. 29, 2009

(30) Foreign Application Priority Data

May 20, 2005 (JP) ............................. 2005-147931

(51) Int. Cl.
*C08K 3/22* (2006.01)
*C08K 3/26* (2006.01)
(52) U.S. Cl. ................... 524/425; 524/437; 428/689
(58) Field of Classification Search ............... 524/425, 524/437; 428/689
See application file for complete search history.

(56) References Cited

U.S. PATENT DOCUMENTS

| 5,418,272 | A | 5/1995 | Kawabata et al. |
| 6,429,246 | B1 | 8/2002 | Rous |
| 6,673,855 | B1 * | 1/2004 | Braga et al. ............... 524/86 |
| 6,809,140 | B2 | 10/2004 | Hase et al. |
| 2004/0171731 | A1 | 9/2004 | Overholt et al. |

FOREIGN PATENT DOCUMENTS

EP     0393959     10/1990

(Continued)

OTHER PUBLICATIONS

JP 09082162, Mar. 1997, Suda et al., English translation of Abstract.*
Extended European Search Report; European Patent Office; Application No. 06745820.8-2102 (PCT/JP2006308939); Jun. 6, 2008; 7 pp; Germany.

*Primary Examiner*—Satya B Sastri
(74) *Attorney, Agent, or Firm*—RatnerPrestia (57) ABSTRACT

A flame-retardant thermoplastic resin composition, comprising a thermoplastic resin (a) and an inorganic flame-retarder (b), the content of the component (b) being 50 to 250 parts by mass with respect to 100 parts by mass of the component (a), wherein the component (a) includes at least one selected from the group consisting of an α-olefin (co)polymer (a-1), a thermoplastic elastomer (a-2) and a rubber (a-3); the component (a) (100% by mass) includes 0.01 to 0.5% by mass of a constituent unit derived from an unsaturated monomer having a carboxylic acid group or acid anhydride group; the component (b) includes 40 to 95% by mass of inorganic metal hydrate (b-1) and 5 to 60% by mass of inorganic filler (b-2); and the average particle diameter of the inorganic filler (b-2) is not more than 2 μm and the aspect ratio of the inorganic filler (b-2) is not more than 1.5.

4 Claims, 1 Drawing Sheet

FOREIGN PATENT DOCUMENTS

| | | |
|---|---|---|
| EP | 0520474 | 12/1992 |
| EP | 1059330 | 12/2000 |
| EP | 1215685 | 6/2002 |
| EP | 1316581 | 6/2003 |
| EP | 1396865 | 3/2004 |
| EP | 1396865 A1 * | 3/2004 |
| JP | 62167339 | 7/1987 |
| JP | 253846 | 2/1990 |
| JP | H364341 | 3/1991 |
| JP | 5239281 | 9/1993 |
| JP | 5345881 | 12/1993 |
| JP | 5345882 | 12/1993 |
| JP | H625367 | 2/1994 |
| JP | 09082162 A * | 3/1997 |
| JP | 107913 | 1/1998 |
| JP | 10237237 | 9/1998 |
| JP | 200160414 | 3/2001 |
| JP | 2002179857 | 6/2002 |
| JP | 2002322324 | 11/2002 |
| JP | 2003518540 | 6/2003 |
| WO | WO 01/98398 | 12/2001 |
| WO | WO 2004/101677 | 11/2004 |
| WO | WO 2004101677 A1 * | 11/2004 |

* cited by examiner

FIG. 1

FLAME-RETARDANT THERMOPLASTIC RESIN COMPOSITION, MOLDED PRODUCT THEREOF AND ELECTRIC WIRE

TECHNICAL FIELD

The present invention relates to a flame-retardant thermoplastic resin composition, a molded product thereof, and an electric wire having a cover made of the flame-retardant thermoplastic resin composition Priority is claimed on Japanese Patent Application No. 2005-147931 filed May 20, 2005, the content of which is incorporated herein by reference.

BACKGROUND ART

Thermoplastic resin is utilized in a wide range field, such as various industrial materials, auto parts, consumer electronic appliances, and packaging materials, because it is cheap and excellent in mechanical strength, heat resistance, chemical durability, mold processability and recyclability. However, since the thermoplastic resin is flammable, many attempts have been made to make the thermoplastic resin flame-retardant. Further, a halogen-free flame-retardant thermoplastic resin composition without generating halogen gas or the like during the combustion has been suggested, as the awareness of environmental problems has been raised.

One of the representative examples of the halogen-free flame-retardant thermoplastic resin composition is a composition in which a polyolefin such as polypropylene, polyethylene or the like, or a thermoplastic elastomer is blended with a metal hydrate as a halogen-free flame-retarder. However, in order to make the molded product formed of halogen-free flame-retardant thermoplastic resin composition flame-retardant as well as the molded product formed of a halogen-based flame-retardant thermoplastic resin composition, it is necessary for the halogen-free flame-retardant thermoplastic resin composition to be blended with a large amount of the metal hydrate, as a result, the mechanical properties of the molded product, such as flexibility, abrasion resistance, low-temperature characteristics, tensile strength or elongation at break have been weakened. Therefore, keeping both flame-retardance and mechanical properties sufficient and well balanced has been required.

In order to solve the aforementioned problems, Patent Document 1 has proposed an olefin-based flame-retardant resin composition including a low-crystallinity and a flexible α-olefin homopolymer or copolymer, and a magnesium hydroxide. This technology provides a molded product with a high flame-retardance by filling a high concentration of magnesium hydroxide, a molded product which is excellent in flexibility and low-temperature characteristics, and a composition which is excellent in processability. However, even in this composition, there are still practical application problems caused by insufficient abrasion resistance and heat resistance.

Further, Patent Document 2 has proposed an abrasion-resistant and flame-retardant resin composition containing an α-olefin (co)polymer, ethylene (co)polymer, or rubber, an inorganic flame-retarder, a polymer having a carboxylic acid group, and the like. Furthermore, Patent Document 3 has proposed a flame-retardant resin composition containing a propylene-based resin, a modified styrene-based thermoplastic elastomer, and a metal hydrate, and it has been produced commercially as a substitute material of vinyl chloride resin.

However, even with the aforementioned compositions, problems of insufficient heat resistance and abrasion resistance in the molded product have remained because the low melting point materials such as ethylene-based polymer, rubber or elastomer have been used to improve the flexibility. Further, because the high-priced synthetic magnesium hydroxide having a small particle diameter is mainly used to achieve the desired characteristics, it was impossible to lower the cost of the materials and expand the sales of the materials as substitute materials of vinyl chloride resin. Therefore further improvements were required.

Patent Document 1: Japanese Unexamined Patent Application, First Publication No. S62-167339

Patent Document 2: Japanese Unexamined Patent Application, First Publication No. H5-239281

Patent Document 3: Japanese Unexamined Patent Application, First Publication No. 2002-179857

DISCLOSURE OF THE INVENTION

As mentioned above, so far, metal hydroxide such as magnesium hydroxide and aluminum hydroxide have been thought to be an effective flame-retarder for the halogen-based flame-retardant thermoplastic resin composition.

In addition, in order to obtain the required flame-retardance, generally a metal hydroxide with a very high concentration of 40 to 70% by mass in the composition is blended in the composition. Especially, in the case used for wire harnesses for automobiles, wires used in devices, and electrical power cords, which require a high flame-retardance and mechanical strength, high-priced magnesium having a small particle diameter of approximately 1 μm is required to be used.

Further, since the metal hydroxide particle is in the shape of scales, an orientation must occurs while the flame-retardant thermoplastic resin composition is molded, thereby increasing the elastic modulus and lowering the flexibility of the molded product.

Further, in the composition including inorganic materials such as metal hydroxide, because detaching occurs on the interface between the inorganic material and the thermoplastic resin, the molded product is significantly whitened, thereby decreasing the tensile strength at break, tensile elongation at break and abrasion resistance. In addition, adding a large amount of the inorganic materials for attaining the desired flame-retardance causes deterioration of the flexibility of the molded product.

The objective of the present invention is to provide a flame-retardant thermoplastic resin composition capable to obtain a molded product which is excellent in flame-retardance, abrasion resistance, flexibility and heat resistance and an electrical wire cover in low-cost without adding a halogen-based flame-retarder, a molded product which is excellent in flame-retardance, abrasion resistance, flexibility and heat resistance without adding a halogen-based flame-retarder and having a sufficient mechanical strength; and an electrical wire.

The flame-retardant thermoplastic resin composition of the present invention includes a thermoplastic resin (a) and an inorganic flame-retarder (b), the content of the inorganic flame-retarder (b) being 50 to 250 parts by mass with respect to 100 parts by mass of the thermoplastic resin (a), wherein the thermoplastic resin (a) includes at least one selected from the group consisting of an α-olefin (co)polymer (a-1) having 2 to 12 carbon atoms, a thermoplastic elastomer (a-2) and a rubber (a-3);

the thermoplastic resin (a) (100% by mass) includes 0.01 to 0.5% by mass of a constituent unit derived from an unsaturated monomer having a carboxylic acid group or acid anhydride group;

the inorganic flame-retarder (b) includes 40 to 95% by mass of inorganic metal hydrate (b-1) and 5 to 60% by mass of inorganic filler (b-2), the sum of the (b-1) and (b-2) is 100% by mass; and the average particle diameter of the inorganic filler (b-2) is not more than 2 μm and the aspect ratio of the inorganic filler (b-2) is not more than 1.5.

The inorganic metal hydrate (b-1) includes not more than 98% by mass of magnesium hydroxide or aluminum hydroxide in the inorganic metal hydrate (b-1) (100% by mass), and the average particle diameter of the inorganic metal hydrate (b-1) preferably is not more than 2 μm.

The inorganic filler (b-2) is preferably calcium carbonate.

The molded product of the present invention is manufactured by molding the flame-retardant thermoplastic resin composition of the present invention.

The electric wire includes a cover made of the flame-retardant thermoplastic resin composition of the present invention.

By using the flame-retardant thermoplastic resin composition of the present invention, a molded product which is excellent in flame-retardance, abrasion resistance, flexibility and heat resistance, and having a sufficient mechanical strength at a low cost can be obtained without adding a halogen-base flame-retarder.

The molded product of the present invention does not include halogen-based flame-retarders, and it is excellent in flame-retardance, abrasion resistance, flexibility and heat resistance, and also has a sufficient mechanical strength.

The cover of the electric wire of the present invention does not include halogen-based flame-retarders, and it is excellent in flame-retardance, abrasion resistance, flexibility and heat resistance, and also has a sufficient mechanical strength.

BEST MODE FOR CARRYING OUT THE INVENTION

<Thermoplastic Resin (a)>

Thermoplastic resin (a) (hereafter, (a) component) is at least one selected from the group consisting of an α-olefin (co)polymer (a-1) (hereafter, (a-1) component) having 2 to 12 carbon atoms, a thermoplastic elastomer (a-2) (hereafter, (a-2) component), and a rubber (a-3) (hereafter, (a-3) component).

It is necessary for the component (a) to include 0.01 to 0.5% by mass of a constituent unit derived from an unsaturated monomer having a carboxylic acid group or acid anhydride group (the unsaturated monomer having an un-reacted carboxylic acid group or acid anhydride group is included) in the component (a) (100% by mass).

If the content of the constituent unit derived from the unsaturated monomer is less than 0.01% by mass, the effect of coupling with an inorganic flame-retarder (b) is not sufficient, so that the mechanical characteristics of the molded product such as abrasion resistance and tensile strength at break decrease remarkably. If the content of the constituent unit derived from the unsaturated monomer exceeds 0.5% by mass, flowability of the thermoplastic resin composition decreases remarkably, thereby causing problems during the molding.

Examples of the unsaturated monomer having a carboxylic acid group or acid anhydride group include α,β-unsaturated dicarboxylic acids such as maleic acid, fumaric acid, citraconic acid, itaconic acid, or anhydrides thereof; and an unsaturated monocarboxylic acids such as acrylic acid, methacrylic acid, furan acid, crotonic acid, vinyl acetic acid and pentenoic acid. Among these, maleic acid and fumaric acid are particularly preferable. These unsaturated monomers can be used alone or by combining two or more.

Examples of the method of introducing the constituent unit derived from the unsaturated monomer having a carboxylic acid group or acid anhydride group to the (a) component include (i) a method of graft copolymerizing the aforementioned unsaturated monomer to at least one selected from the group consisting of (a-1) component, (a-2) component, and (a-3) component; (ii) a method of randomly copolymerizing an ethylene and the aforementioned unsaturated monomer; (iii) a method of melt kneading the aforementioned unsaturated monomer with at least one selected from the group consisting of (a-1) component, (a-2) component and (a-3) component in the presence of an organic peroxide or the like using an extruder.

The method (i) is a method of graft copolymerizing the aforementioned unsaturated monomer to at least one of the (a-1) component, (a-2) component and (a-3) component by melting method or solution method in the both presence and non-presence of a radical initiator. From the view point of economic efficiency, the melting method is preferable. Examples of the radical initiator include organic peroxide, dihydroaromatic compound, dicumyl compound, and the like.

Examples of the organic peroxide include hydroxy peroxide, dicumyl peroxide, t-butylcumyl peroxide, dialkyl(allyl) peroxide, diisopropyl benzene hydroperoxide, dipropionyl peroxide, dioctanoyl peroxide, benzoyl peroxide, peroxy succinic acid, peroxy ketal, 2,5-dimethyl-2,5di(t-butyl peroxy) hexane, t-butyl oxyacetate, t-butyl peroxy isobutyrate.

Examples of the dihydroaromatic compound include dihydroquinoline or derivative thereof, dihydrofuran, 1,2-dihydrobenzene, 1,2-dihydronaphthalene, 9,10-dihydrophenanthrene, and the like.

Examples of the dicumyl compound include 2,3-dimethyl-2,3-diphenylbutane, 2,3-diethyl-2,3-diphenylbutane, 2,3-diethyl-2,3-di(p-methylphenyl) butane, 2,3-diethyl-2,3-di(p-bromophenyl)butane, and the like. Among these, 2,3-diethyl-2,3-diphenylbutane is particularly preferable.

(α-Olefin (Co)Polymer Having 2 to 12 Carbon Atoms (a-1))

Examples of the component (a-1) include homopolymer or copolymer of ethylene, propylene, 1-butene, 4-methyl-1-pentene, 1-hexene, 1-octene, 1-dodecene, and mixture thereof. Among these, components (a-1-1) to (a-1-4) described below are preferable. These components can be used alone or by combining two or more.

(a-1-1): any one of the homopolymer of propylene, random copolymer of propylene and ethylene, and propylene-α-olefin block copolymer including propylene, ethylene and 1-butene.

(a-1-2): low density polyethylene or ethylene-α-olefin copolymer.

(a-1-3): ethylene-vinyl ester copolymer (a-1-4): ethylene-α,β-unsaturated carboxylic acid alkyl ester copolymer.

Examples of the component (a-1-2) include a low density polyethylene (LDPE) with a density not less than 0.86 g/cm$^3$ and less than 0.94 g/cm$^3$ obtained by a high-pressure radical polymerization method; a copolymer (Very Low Density Polyethylene, VLDPE) of an ethylene with a density not less than 0.86 g/cm$^3$ and less than 0.91 g/cm$^3$ obtained by a intermediate- or low-pressure method, or other well-known method using a Ziegler catalyst and α-olefin having 3 to 12 carbon atoms; and a copolymer (Linear Low Density Polyethylene, LLDPE) of an ethylene with a density not less than 0.91 g/cm$^3$ and less than 0.94 g/cm$^3$ and α-olefin having 3 to 12 carbon atoms.

Examples of the α-olefin having 3 to 12 carbon atoms include propylene, 1-butene, 4-methyl-1-pentene, 1-hexene, 1-octene, 1-dodecene, and the like. Among these, 1-butene, 4-methyl-1-pentene, 1-hexene and 1-octene are preferable, and 1-butene is particularly preferable. The content of the α-olefin unit in the ethylene-α-olefin copolymer is preferably within the range of 5 to 40% by mol.

The VLDPE is a polyethylene having a middle characteristic between the LLDPE and ethylene-α-olefin copolymer rubber. In the VLDPE, the density of the VLDPE is 0.86 g/cm$^3$ or more and less than 0.91 g/cm$^3$, the maximum peak temperature (Tm) measured by differential scanning calorimetry (DSC) is 100° C. or more, and the content of the boiling n-hexane-insoluble component is 10% by mass or more. More specifically, the VLDPE is a copolymer of an ethylene and α-olefin having 3 to 12 carbon atoms, having the both high-crystal portion that the LLDPE shows and amorphous portion that the ethylene-α-olefin copolymer rubber shows, and also having the both characteristics of the LLDPE such as mechanical strength, heat resistance or the like, and characteristics of the ethylene-α-olefin copolymer rubber such as self-adhesive, rubber-like elasticity, low temperature shock resistance or the like with well balance. Therefore, the VLDPE is very useful as the (a-1-2) component. The VLDPE can be manufactured using a catalyst obtained by combining a solid catalyst component including at least one of magnesium and titan with an organic aluminum compound.

The (a-1-3) component is a copolymer of an ethylene which is a main component and a vinyl ester monomer such as vinyl propionate, vinyl acetate, vinyl caproate, vinyl caprylate, vinyl laurate, vinyl stearate, vinyl trifluoro acetate. The (a-1-3) component can be manufactured by a method of high-pressure radical polymerization. Among these, the ethylene-vinyl acetate copolymer (EVA) is particularly preferable. As for the EVA, a copolymer including 50 to 99.5% by mass of ethylene and 0.5 to 50% by mass of vinyl acetate is preferable, and a copolymer including 70 to 95% by mass of ethylene and 5 to 30% by mass of vinyl acetate is particularly preferable because of the physical and economic reasons.

The (a-1-4) component is preferably manufactured by a method of high-pressure radical polymerization. Specific examples of the (a-1-4) component include ethylene-methyl (meth)acrylate copolymer, ethylene-ethyl (meth)acrylate copolymer, and the like. Among these, ethylene-ethyl acrylate copolymer (EEA) is particularly preferable. As for the EEA, a copolymer including 50 to 99.5% by mass of ethylene and 0.5 to 50% by mass of ethyl acrylic ester is preferable, and a copolymer including 70 to 95% by mass of ethylene and 5 to 30% by mass of ethyl acrylic ester is particularly preferable because of the physical and economic reasons.

The melt flow rate (hereafter, MFR) of the (a-1) component is preferably within the range of 0.01 to 50 g/10 min, more preferably within the range of 0.05 to 20 g/10 min, and even more preferably within the range of 0.1 to 10 g/10 min. If the MFR is less than 0.01 g/10 min, the processability may decrease, and if the MFR exceeds 50 g/10 min. the mechanical strength of the molded product may decreases.

(Thermoplastic Elastomer (a-2))

Thermoplastic elastomer as the (a-2) component is generally composed of a hard component which is called a hard segment and a soft component which is called a soft segment. The thermoplastic elastomer (a-2) has the characteristics of rubber because the hard segment works as a cross-link point at the a normal temperature, and also can be used for molding-process using a molding machine such as compressor, extruder, injection by softening the material, because the hard segment is melted at a high temperature, same as the thermoplastic resin. Because the molding cycle of the (a-2) thermoplastic elastomer is short, and it can be recycled despite all most other elastomers (rubber) can not, the (a-2) thermoplastic elastomer corresponds to the recent trend of resource-recycling and the demand of the (a-2) thermoplastic elastomer increases.

Examples of the (a-2) component include styrene-based thermoplastic elastomer (SBC), olefin-based thermoplastic elastomer (TPO), urethane-based thermoplastic elastomer (PU), ester-based thermoplastic elastomer (TPEE), amide-based thermoplastic elastomer (TPAE), and the like. Among these, from the view point of affinity for mixing with the (a-1) component, the (a-2-1) olefin-based thermoplastic elastomer and (a-2-2) styrene-based thermoplastic elastomer are preferable. These can be used alone, or by mixing two or more.

In order to distinguish the olefin-based thermoplastic elastomer of the (a-2-1) component from the soft polyolefin resin, an elastomer in which the ratio of the soft segment (the elastomer component or xylene-soluble component) is not less than 20% by mass is defined as a thermoplastic elastomer. The (a-2-1) component can be classified into an (a-2-1-1) simple blending type, (a-2-1-2) reactor made type, and (a-2-1-3) dynamic vulcanizing type.

The olefin-based thermoplastic elastomer of the (a-2-1-1) simple blending type is an olefin-based thermoplastic elastomer in which a polyolefin component and rubber component are kneaded and dispersed by the Banbury mixer, plastomill, twin screw extruder, or the like. As for the rubber (rubber particle) component, non-cross-link rubber or partial cross-link rubber can be used. If the degree of the cross-link of the rubber is raised to a too high level, as a result, the dispensability of the rubber component is inferior and the characteristic of the olefin-based thermoplastic elastomer obtained is inferior.

Examples of the olefin-based thermoplastic elastomer of the (a-2-1-2) reactor made type include a propylene-α-olefin copolymer containing 40 to 80% by mass of xylene-soluble component (elastomer component), which is manufactured by a multiple-stage polymerization method disclosed in Japanese Unexamined Patent Application, First publication No. H6-25367. The multiple-stage polymerization method is a method including two or more polymerization stages during the manufacturing. The manufacturing step includes the first stage in which a homopolymer of propylene, or a crystalline random copolymer of propylene and not more than 5% by mass of α-olefin other than propylene is manufactured, and the second stage thereafter in which a random copolymer elastomer of ethylene and at least one α-olefin having 3 or more carbon atoms is manufactured. In the olefin-based thermoplastic elastomer obtained by this polymerization method, the component of ethylene-α-olefin random copolymer elastomer can be dispersed more finely in the crystalline propylene resin manufactured at the first stage compared with the conventional mechanical blending method, because the resin components generated at each stage is blended in a reactor during the polymerization. The average particle diameter of the elastomer component is preferably not more than 5 μm, and it is preferable to the elastomer component to have inter-penetrating network structure without having clear island-sea dispersion structure. The average particle diameter of the elastomer is particularly preferably not more than 1 μm.

In this way, it is necessary for the elastomer component having a high molecular weight to be dispersed finely with a micro-scale, in order to improve the dispersibility of the inorganic flame-retarder (b), and the low temperature characteristic and abrasion resistance of the molded product obtained.

The average particle diameter of the elastomer component is measured using a scanning electron microscope (SEM).

As for the elastomer component, ethylene-propylene random copolymer or ethylene-butene random copolymer is preferable. In order to make the particle diameter of the elastomer small, the content of the ethylene unit or butene unit in the elastomer component is preferably within the range of 15 to 50% by mass, and particularly preferably within the range of 20 to 40% by mass. If the content of the ethylene unit or butene unit is less than 15% by mass, or excess of 50% by mass, the particle diameter of the elastomer becomes larger.

The content of the xylene-soluble component in the propylene-α-olefin copolymer manufactured by the multiple-stage polymerization method is preferably within the range of 50 to 80% by mass, particularly preferably within the range of 55 to 75% by mass. If the content of the xylene-soluble component is less than 50% by mass, the dispersibility of de inorganic flame-retarder (b), flexibility and low temperature characteristic of the molded product obtained may be insufficient. If the content of the xylene-soluble component exceeds 80% by mass, the mechanical strength of the molded product decreases, and handling becomes difficult at the time of compounding the resin composition as a result of a deterioration of powder characteristics of the propylene-α-olefin copolymer.

As for the crystalline propylene resin in the propylene-α-olefin copolymer manufactured by the multiple-stage polymerization method, a propylene homopolymer is preferable from the view points of heat resistance and abrasion resistance.

The content of the xylene-soluble component is measured as follows. 2.5 g of the resin was dissolved in 250 ml of xylene at 135° C. while stirring the resin. After 20 minutes, the solution was cooled to 25° C. while stirring, and then the insoluble component was deposited for 30 minutes. After filtration of the deposition, filtration liquid was evaporated under a flow of nitrogen, and the residue was vacuum dried at 80° C. until the weight of the residue was constant. Then, the residue was weighed to calculate the content (%) of the xylene-soluble component by mass at 25° C.

The olefin-based thermoplastic elastomer of the (a-2-1-3) dynamic vulcanizing type is an olefin-based thermoplastic elastomer including a random copolymer (EPDM) rubber disclosed in Japanese Unexamined Patent Application, First Publication No. H3-64341 as a component. The random copolymer (EPDM) rubber includes one obtained by adding a random copolymer (EPM) rubber and diene monomer (dicyclopentadiene, ethylidenenorbornene, or the like) to a matrix resin (any one of propylene homopolymer, random copolymer of propylene and ethylene, and propylene-α-olefin block copolymer containing propylene, ethylene and 1-butene), as a main component. The random copolymer (EPM) rubber includes an ethylene and propylene as a main component. In addition, the organic peroxide and cross-link assistant are added to each component, and then kneaded, so as to vulcanize the rubber at the time kneading, thereby forming a partial cross-link structure in the system.

The (a-2-2) styrene-based thermoplastic elastomer is a block copolymer having a polystyrene phase at its terminals, and the intermediate phase thereof includes polybutadiene, polyisoprene, ethylene-butylene copolymer, ethylene-propylene copolymer, or butylene-propylene copolymer. Among these, styrene-ethylene-butylene-styrene block copolymer (hereafter, SEBS) is most preferable. The content of the styrene unit in the SEBS is preferably within the range of 20 to 40% by mass, more preferably within the range of 25 to 35% by mass. If the content of the styrene unit is less than 20% by mass, the abrasion resistance of the molded product may be inferior. If the content of the styrene unit exceeds 40% by mass, dispersibility of the (a-2-2) styrene-based thermoplastic elastomer is inferior, as a result, it is impossible to display the effect of improving the mechanical characteristics of the molded product.

(Rubber (a-3))

Examples of the (a-3) component include ethylene propylene-based rubber, natural rubber, nitrile rubber, and the like. These can be used alone, or used by mixing two or more. Further, the (a-3) component can be any one of the crosslink type, partial cross-link type, and non-cross-link type.

Examples of the ethylene propylene-based rubber include a random copolymer (EPM) including an ethylene and propylene as a main component, and a random copolymer (EPDM) including one obtained by adding a diene monomer (dicyclopentadiene, ethylidenenorbornene, or the like) to the EPM as the third component.

<Inorganic Flame-Retarder (b)>

The inorganic flame-retarder (b) (hereafter, (b) component) includes 40 to 95% by mass of the inorganic metal hydrate (b-1) (hereafter, (b-1) component) and 5 to 60% by mass of the inorganic filler (b-2) (hereafter, (b-2) component). The sum of (b-1) component and (b-2) component is 100% by mass.

The content of the (b-1) component and (b-2) component is preferably within the range of 45 to 80% by mass and the range of 22 to 55% by mass respectively, more preferably within the range of 50 to 70% by mass and the range of 30 to 50% by mass respectively. If the content of the (b-1) component is less than 40% by mass, the flame-retardance of the molded product is inferior, thereby impossible to meet the required properties. If the content of the (b-1) component exceeds 95% by mass, the molded product becomes hard, and the cost of the materials increases, thereby lowering the economic efficiency.

<Inorganic Metal Hydrate (b-1)>

Examples of the (b-1) component include a hydroxide of magnesium, aluminum, calcium, potassium, zinc, silicon, and the like. These can be used alone, or by mixing two or more. Among these, magnesium hydroxide and aluminum hydroxide are preferable taking the high flame-retardance and economic efficiency into consideration.

The average particle diameter of magnesium hydroxide or aluminum hydroxide is preferably not more than 20 μm, more preferably not more than 10 μm, even more preferably not more than 5 μm, and particularly preferably not more than 2 μm. The average particle diameter is preferably not less than 0.01 μm.

In order to prevent the aggregation of the (b-1) component and improve the dispersibility with the (a) component, surface treatment can be performed using fatty acid such as stearic acid, oleic acid, palmitic acid, or metal salt thereof, wax, organic titanate, organic silane. If the amount of the surface treatment agent is too large, the flame-retardance of the molded product becomes inferior and the coupling effect of the functional group in the (a) component decreases, thereby weakening the tensile characteristic and abrasion resistance of the molded product in some cases. Therefore, the content of magnesium hydroxide or aluminum hydroxide in the (b-1) component (100% by mass) is preferably not less than 98% by mass, and more preferably not less than 99% by mass.

The actual amount of the (b-1) component can be measured by the following method in the case of magnesium hydroxide as an example.

300 mg of magnesium hydroxide is accurately weighed and moistened with about 1 mL of ethanol. Then 12 mL of 1 mol/L hydrochloric acid is added to the resulting liquid, and the resulting liquid is heated so as to be melted, then the resulting liquid is cooled. After that, water is added to the resulting liquid so as to be adjusted to 200 mL exactly. 10 mL of the resulting liquid is measured exactly and about 80 mL of water is added thereto, then the resulting liquid is neutralized in a 0.02 mol/L sodium hydroxide solution. After that, 2 mL of ammonia/ammonium chloride buffer solution with a pH of 10.7 is added to the resulting liquid, and then 0.01 mol/L ethylenediaminetetraacetic acid disodium salt dihydrate (EDTA) is titrated using an automatic titration apparatus.

(Inorganic Filler (b-2))

Examples of the (b-2) component include calcium carbonate, calcium sulfite, calcium silicate, chalk, diatomaceous earth, talc, alumina, silica sand, glass powder, iron oxide, metal powder, graphit, silicon carbide, silicon nitride, silica, boron nitride, aluminum nitride, carbon black, mica, glass substrate, sericite, pyrophyllite, aluminum flake, black smoke, shirasuballoon, metal balloon, glass balloon, pumice stone, wollastonite, and the like. Among these, from the view point of the economic efficiency, the light calcium carbonate or heavy calcium carbonate is preferable.

The aspect ratio of the (b-2) component is preferably not more than 1.5, and more preferably within the range of 1.0 to 1.3, for providing flexibility to the molded product. The average diameter of the (b-2) component is preferably not more than 2 μm and not more than 1.5 μm in order to maintain the dispersibility of the combination with the (b-1) component and mechanical strength of the molded product. The average particle diameter is preferably not less than 0.01 μm.

In order to prevent the aggregation of the (b-2) component and improve the dispersibility with the (a) component, surface treatment may be performed using fatty acid such as stearic acid, oleic acid, palmitic acid, or metal salt thereof, wax, organic titanate, organic silane. If the amount of the surface treatment agent is too large, the flame-retardance of the molded product becomes inferior and the coupling effect of the functional group in the (a) component decreases, thereby weakening the tensile characteristic and abrasion resistance of the molded product in some cases. Therefore, the substantial amount of the (b-2) component is preferably not less than 98% by mass, and more preferably not less than 99% by mass.

The actual amount of the (b-2) component was measured by the same method as the (b-1) component.

The average particle diameters of the (b-1) component and (b-2) component awe measured using a scanning electron microscope (SEM).

<Flame-Retardant Thermoplastic Resin Composition>

The flame-retardant thermoplastic resin composition of the present invention includes (a) component and (b) component, the content of the (b) component being 50 to 250 parts by mass with respect to 100 parts by mass of the (a) component.

If the content of (b) component is less than 50 parts by mass, the flame-retardance of the molded product is insufficient. If the content of the (b) component exceeds 250 parts by mass, the molded product becomes too hard, thereby being unsuitable for practical use. The amount of (b) component is preferably within the range of 55 to 230 parts by mass with respect to 100 parts by mass of the (a) component, and particularly preferably within the range of 55 to 200 parts by mass with respect to 100 parts by mass of the (a) component.

The flame-retardant thermoplastic resin composition of the present invention can be manufactured by continuously supplying a predetermined quantity of the components from a constant quantity feeder, or by melt kneading using a commonly-known kneader, such as a single screw extruder, twin screw extruder, Banbury mixer, kneader, or roller mill, following preblending of the components beforehand using a high-speed mixing apparatus, such as Henschel mixer or tumbler.

With regard to the flame-retardant thermoplastic resin composition of the present invention, an appropriate quantity of various auxiliary components which are usually used to blend can be included, for example, various antioxidants such as a phenol, a phosphorus, and a sulfur, coloring agents, nucleating agents, antistatic agents, lubricating agents such as an wax, paraffin, higher fatty acid, ester thereof, amide or metal salt, silicone, and fluoro-resin, slipping agents, processing aids, metallic deactivating agents, and an anti-ultraviolet agents.

<Molded Product>

The molded product of the present invention is manufactured by molding the flame-retardant thermoplastic resin composition of the present invention. There are no particular restrictions on the molding method, and various well-known molding methods can be used according to use. For example, an injection molding method, extruder molding method, pressure molding method, hollow molding method, or the like can be used.

The flame-retardant thermoplastic resin composition of the present invention can be used widely for various molded products, and preferably used for electric wire covers of harnesses for automobiles, connector parts, tapes, electric wires used in electric apparatuses, covers of power cords, wall papers, building material films, sheets, flooring materials, pipes, or the like.

<Electric Wire>

The electric wire of the present invention made of the flame-retardant thermoplastic resin composition of the present invention has a cover around the conductor. Examples of the electric wire of the present invention include wire harnesses for automobiles, electric wires used in electric apparatuses for electric appliances, power cords, and the like.

Examples shown below describe the present invention more specifically, although the present invention is not restricted by the examples.

<(a) Component>((a-1) Component)

(a-1-1) Component:

Homopolypropylene (PP-1): manufactured by SunAllomer Co., PS201A, MFR=0.5 g/10 min, xylene-soluble component=1.5% by mass.

Block polypropylene (PP-2): manufactured by SunAllomer Co., PB170A, MFR=0.3 g/10 min, xylene-soluble component=17% by mass.

(a-1-2) Component:

Low-density polyethylene (LDPE): manufactured by Mitsui Petrochemical Industries Ltd., MIRASON 3530, MFR=0.23 g/10 min, density=0.924 g/cm$^3$.

Maleic acid modified ethylene-butene-1 copolymer (Mah-LL): manufactured by Japan Polyethylene Co., ADTX DU6300, MFR=1.0 g/10 min, content of maleic anhydride unit=0.2% by mass.

(a-1-3) Component:
Ethylene-vinyl acetate copolymer (EVA): manufactured by Japan Polyethylene Co., NOVATEC EVA LV342, content of vinyl acetate unit=10% by mass, MFR=2.0 g/10 min (a-1-4) Component:
Ethylene-ethyl acrylate copolymer (EEA): Japan Polyethylene Co., REXPEARL EEA A1100, content of ethyl acrylate unit=10% by mass, MFR=0.4 g/10 min ((a-2) Component)
(a-2-1) Component:
Multiple-stage polymerized polypropylene copolymer (multiple-stage polymerized PP-1): manufactured by SunAllomer Co., Catalloy Q200F, MFR=0.8 g/10 min, xylene-soluble component=60% by mass.

Multiple-stage polymerized polypropylene copolymer (multiple-stage polymerized PP-2): manufactured by SunAllomer Co., Catalloy 7334XEP, MFR=0.8 g/10 min, xylene-soluble component=70% by mass.

Partial cross-link olefin-based thermoplastic elastomer (TPO): manufactured by Mitsui Chemicals, Inc., milastomer 9020N, MFR=12 g/10 min (a-2-2) Component:
SEBS: manufactured by Craton Polymers LLC., craton G1652, content of styrene unit=29% by mass, MFR=10 g/10 min.

Maleic acid modified SEBS (Mah-SEBS): Manufactured by Craton Polymers LLC., craton FG1901X, content of styrene unit=28% by mass, MFR=22 g/10 min, content of maleic anhydride unit=1.0% by mass.

((a-3) Component)
Rubber: manufactured by Mitsui Petrochemical Industries Ltd., TAFMER P-0280, MFR=2.9 g/10 min, xylene-soluble component=99% by mass.

(Xylene-Soluble Component, Xylene-Insoluble Component)
2.5 g of the resin was dissolved in 250 ml of xylene at 135° C. while stirring the resin. After 20 minutes, the solution was cooled to 25° C. while stirring, and then the insoluble component was deposited for 30 minutes. After filtration of the deposition, filtration liquid was evaporated under a flow of nitrogen, and the residue was vacuum dried at 80° C. until the weight of the residue was constant. Then, the residue was weighed to calculate the content of the xylene-soluble component by mass at 25° C.

(MFR)
MFR is measured in accordance with JIS K 7210. The polypropylene-based resin is measured at 230° C. with a load of 2.16 kg, and the polyethylene-based resin is measured at 190° C. with a load of 2.16 kg.

<(b) Component> ((b-1) Component)
Low surface treatment agent of magnesium hydroxide (Mg(OH)$_2$-1): manufactured by Kyowa Chemical Industry Co., Ltd., low surface treatment agent of KISUMA 5A, content of Mg(OH)$_2$=99.3% by mass, average particle diameter=0.8 µm, aspect ratio=4.

Surface treatment agent of magnesium hydroxide-silane coupling agent (Mg(OH)$_2$-2): manufactured by Kyowa Chemical Industry Co., Ltd., KISUMA 5P, content of Mg(OH)$_2$=99.5% by mass, average particle diameter=0.8 µm, aspect ratio=4.

Aluminum hydroxide (Al(OH)$_3$): Manufactured by Showa Denko K.K., HIGILITE H-42, content of Al(OH)$_3$=99.6% by mass, average particle diameter=1.1 µm, aspect ratio=1.5.

((b-2) Component)
Light calcium carbonate (CaCO$_3$-1): manufactured by SHIRAISHI CALCIUM KAISHA, LTD., HAKUENKA CC, average particle diameter=0.04 µm, aspect ratio=1.0.

Heavy calcium carbonate (CaCO$_3$-2): manufactured by SHIRAISHI CALCIUM KAISHA, LTD., µ-Powder3N, average particle diameter=1.1 µm, aspect ratio=1.0.

Heavy calcium carbonate (CaCO$_3$-3): Manufactured by SHIRAISHI CALCIUM KAISHA, LTD., SOFTON 1800, average particle diameter=2.3 µm, aspect ratio=1.0.

Heavy calcium carbonate (CaCO$_3$-4): Manufactured by SHIRAISHI CALCIUM KAISHA, LTD., Silver-W, average particle diameter=0.41 µm, aspect ratio=3.0.

EXAMPLES 1 TO 11, COMPARATIVE EXAMPLES 1 TO 9

Each component shown in Tables 1 and 2 was mixed in a 20-L Henschel mixer, then kneaded at a die temperature of 200° C. using a ϕ30 mm co-rotating twin screw extruder thereby manufacturing a pellet of the flame-retardant thermoplastic resin composition. The resulting composition was molded at a temperature of 230° C. with a take-off speed of 2.0 m/min using a 100 mm-width T-die attached to the tip of a ϕ30 mm extruder, thereby manufacturing a sheet with a thickness of 0.2 mm.

Further, the electric wire was manufactured by covering the flame-retardant thermoplastic resin composition on a copper single wire with a diameter of 0.7 mm using a cross-head die attached to a ϕ20 m extruder, so that the thickness of the cover was 0.2 mm. The die temperature was 230° C. and take-off temperature was 10 m/min.

The obtained sheet and electric wire were evaluated as follows. In the tensile test, the data of T-die sheet flow direction was used.

(Tensile Test)
From the 0.2 mm thick sheet, a JIS K 6251 No. 3 dumbbell was punched through along the sheet flow direction, and test specimens were prepared. Then, at room temperature, tensile test was performed with tensile speed of 200 mm/min, distance between chucks of 60 mm, distance between marked lines $L_0$ of 20 mm, and the strength at the time of break of the test specimen divided by the minimum cross-sectional area was made the tensile strength. Furthermore, the distance between marked lines at the time of break was denoted by L, and the elongation at break was calculated from the formula $(L-L_0)/L_0 \times 100$.

Figure 1:
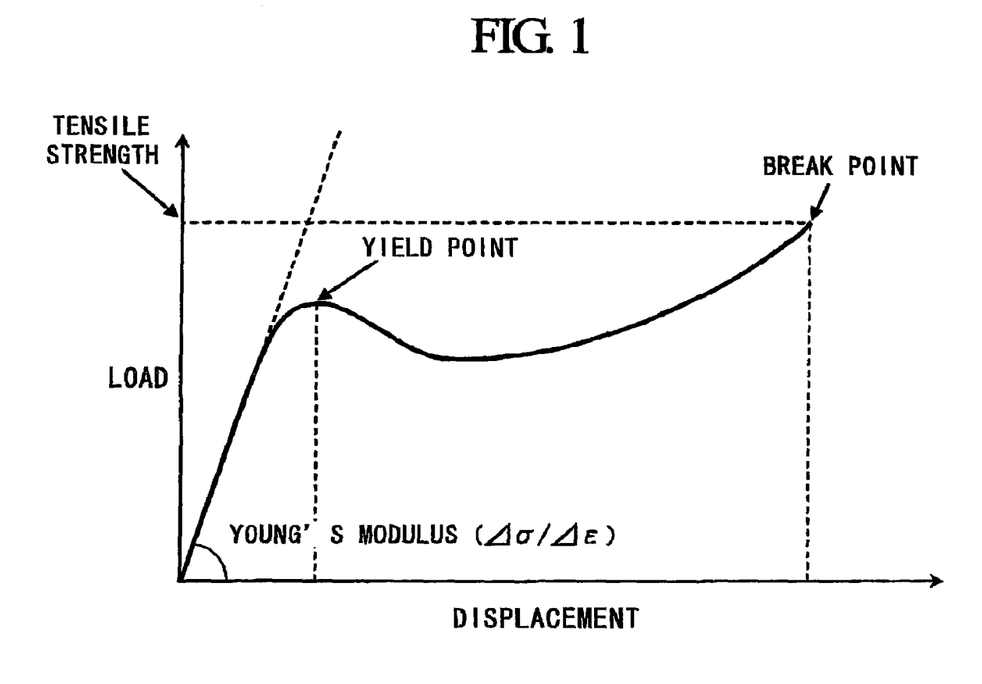
FIG. 1 is a graph of load-displacement curves measured in a tensile test.

The Young's modulus was calculated as follows. A tangent was drawn at the initial straight line of the load-displacement curves shown in FIG. 1 and two arbitrary points were set, then the Young's modulus was calculated using $E=\Delta\sigma/\Delta\epsilon$, from the difference in stress $\Delta\sigma$ between the two points, and the difference in distortion $\Delta\epsilon$ between the same two points.

(Abrasion Resistance)
With respect to the electric wire, an abrasion test was performed by the blade reciprocation method exhibited in JASO D611-12-(2), under the conditions of load of 3N or 1N using a ϕ0.45 mm piano wire as the blade.

(Combustion Test)
A combustion test was performed on the electric wire. With respect to the electric wire including not more than 70 parts by mass of the inorganic flame-retarder, 45° C. combustion test exhibited in JIS C 3005 was performed, and the electric wire extinguished in 70 seconds was defined as "Good", and the one which was not extinguished in 70 seconds was defined as "Bad".

Further, with respect to the electric wire including not less than 200 parts by mass of the inorganic flame-retarder, the measurement was performed based on JIS K 7106, using the UL-94 vertical combustion method.

(Heat Deformation Test)
With respect to the sheet, the measurement was carried out based on JIS C3605. The test conditions were a temperature of 100° C. and load of 3 kgf.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| (a-1-1) | PP-1 | % by mass | | 20 | 20 | 20 | 20 | | | | | | |
| (a-1-1) | PP-2 | % by mass | 50 | | | | | 30 | 30 | 10 | | | |
| (a-1-2) | LDPE | % by mass | | 10 | 10 | 10 | 10 | | | | | | |
| (a-1-2) | Mah-LL | % by mass | | | | | | 10 | 10 | 10 | | | |
| (a-1-3) | EVA | % by mass | | | | | | 60 | | 20 | | | |
| (a-1-4) | EEA | % by mass | | | | | | | 60 | 60 | | | |
| (a-2-1) | Multiple-stage polymerized PP-1 | % by mass | 40 | 60 | 60 | 60 | 50 | | | | 90 | | 50 |
| (a-2-1) | Multiple-stage polymerized PP-2 | % by mass | | | | | | | | | | 90 | |
| (a-2-1) | TPO | % by mass | | | | | | | | | | | 40 |
| (a-2-2) | Mah-SEBS | % by mass | 10 | 10 | 10 | 10 | 10 | | | | 10 | 10 | 10 |
| (a-3) | Rubber | % by mass | | | | | 10 | | | | | | |
| (b-1) | Mg(OH)$_2$-1 | part by mass | 35 | 35 | | 35 | 35 | 35 | 35 | | 150 | 150 | 150 |
| (b-1) | Mg(OH)$_2$-2 | part by mass | | | 35 | | | | | | | | |
| (b-1) | Al(OH)$_3$ | part by mass | | | | | | | | 35 | | | |
| (b-2) | CaCO$_3$-1 | part by mass | 35 | 35 | 35 | | 35 | 35 | 35 | 35 | 50 | 50 | 50 |
| (b-2) | CaCO$_3$-2 | part by mass | | | | 35 | | | | | | | |
| (b-2) | CaCO$_3$-3 | part by mass | | | | | | | | | | | |
| (b-2) | CaCO$_3$-4 | part by mass | | | | | | | | | | | |
| Unit of unsaturated monomer including Carboxylic acid group or acid anhydride group | | % by mass | 0.1 | 0.1 | 0.1 | 0.1 | 0.1 | 0.02 | 0.02 | 0.02 | 0.1 | 0.1 | 0.1 |
| Evaluation result | Tensile strength | MPa | 33 | 31 | 33 | 31 | 29 | 29 | 30 | 26 | 15 | 13 | 16 |
| | Tensile elongation | % | 450 | 540 | 520 | 600 | 500 | 480 | 500 | 310 | 210 | 280 | 200 |
| | Young's modulus | MPa | 720 | 480 | 530 | 400 | 420 | 650 | 600 | 480 | 180 | 100 | 80 |
| | Abrasion resistance (load of 3N) | freq. | 205 | 140 | 178 | 147 | 125 | 130 | 145 | 126 | — | — | — |
| | Abrasion resistance (load of 1N) | freq. | — | — | — | — | — | — | — | — | 140 | 110 | 145 |
| | Combustion test (45°) | — | Good | Good | Good | Good | Good | Good | Good | Good | — | — | — |
| | Combustion test (vertical) | — | — | — | — | — | — | — | — | — | V-0 | V-0 | V-0 |
| | Heat deformation test | % | 7.0 | 8.9 | 8.0 | 9.0 | 9.4 | 7.2 | 6.8 | 6.2 | 10.5 | 16.4 | 11.3 |

TABLE 2

| | | | Comparative Example | | | | | | | | |
|---|---|---|---|---|---|---|---|---|---|---|---|
| | | | 1 | 2 | 3 | 4 | 5 | 6 | 7 | 8 | 9 |
| (a-1-1) | PP-1 | % by mass | | | | | | | 20 | | |
| (a-1-1) | PP-2 | % by mass | 50 | 30 | 50 | 50 | 50 | 40 | | 30 | |
| (a-1-2) | LDPE | % by mass | | | | | | | 10 | 6 | |
| (a-1-2) | Mah-LL | % by mass | | | | | | | | 4 | |
| (a-1-3) | EVA | % by mass | | | | | | | | | 60 |
| (a-1-4) | EEA | % by mass | | | | | | | | | |
| (a-2-1) | Multiple-stage polymerized PP-1 | % by mass | 40 | 60 | 40 | 40 | 40 | | 60 | | 90 |
| (a-2-1) | Multiple-stage polymerized PP-2 | % by mass | | | | | | | | | |
| (a-2-1) | TPO | % by mass | | | | | | | | | |
| (a-2-2) | Mah-SEBS | % by mass | 10 | 10 | 10 | 10 | 10 | 60 | 10 | | 10 |
| (a-3) | Rubber | % by mass | | | | | | | | | |
| (b-1) | Mg(OH)$_2$-1 | part by mass | 70 | 70 | 20 | 35 | 35 | 35 | 35 | 35 | 200 |
| (b-1) | Mg(OH)$_2$-2 | part by mass | | | | | | | | | |
| (b-1) | Al(OH)$_3$ | part by mass | | | | | | | | | |
| (b-2) | CaCO$_3$-1 | part by mass | | | | 50 | | 35 | 10 | 35 | 60 |
| (b-2) | CaCO$_3$-2 | part by mass | | | | | | | | | |
| (b-2) | CaCO$_3$-3 | part by mass | | | | | 35 | | | | |
| (b-2) | CaCO$_3$-4 | part by mass | | | | | | 35 | | | |
| Unit of unsaturated monomer including Carboxylic acid group or acid anhydride group | | % by mass | 0.1 | 0.1 | 0.1 | 0.1 | 0.1 | 0.6 | 0.1 | 0.008 | 0.1 |
| Evaluation result | Tensile strength | MPa | 34 | 30 | 31 | 23 | 29 | Impossible to manufacture because the resin pressure is high | 32 | 27 | 15 |
| | Tensile elongation | % | 380 | 420 | 400 | 290 | 350 | | 640 | 590 | 30 |
| | Young's modulus | MPa | 950 | 720 | 610 | 700 | 980 | | 310 | 560 | 320 |
| | Abrasion resistance (load of 3N) | freq. | 225 | 196 | 196 | 136 | 189 | | 350 | 83 | — |
| | Abrasion resistance (load of 1N) | freq. | — | — | — | — | — | | — | — | 45 |
| | Combustion test (45°) | — | Good | Good | Bad | Bad | Good | | Bad | Good | — |
| | Combustion test (vertical) | — | — | — | — | — | — | | — | — | V-0 |
| | Heat deformation test | % | 6.8 | 9.5 | 7.6 | 8.3 | 6.0 | | 12.1 | 6.1 | 9.1 |

Comparative Example 1 is an example in which 100% by mass of the inorganic metal hydrate (b-1) was used as the inorganic flame-retarder (b). In the resin composition obtained from this example, the Young's modulus was high, and the flexibility was inferior.

Comparative Example 2 is an example in which the thermoplastic resin (a) of Comparative Example 1 is made to flexible so as to have the same hardness of Example 1. In the resin composition obtained from this example, the flame-retardance significantly decreased when attempting to maintain the flexibility using the (a) component. In addition, in the resin composition obtained from this example, manufacturing cost increased due to the large amount of the inorganic metal hydrate (b-1).

Comparative Example 3 is an example in which the amount of the inorganic filler (b-2) exceeds the upper limit of the present invention. In the resin composition obtained from this example, the fine-retardance was inferior.

Comparative Example 4 is an example in which the average particle diameter of the inorganic filler (b-2) exceeds 2 μm. In the resin composition obtained from this example, the abrasion resistance and flame-retardance were inferior.

Comparative Example 5 is an example in which the aspect ratio of the inorganic filler (b-2) exceeds 1.5. In the resin composition obtained from this example, the flexibility was weakened significantly.

Comparative Example 6 is an example in which the content of the constituent unit of the unsaturated monomer having a carboxylic acid group or acid anhydride group in the thermoplastic resin (a) exceeds 0.5% by mass. In the resin composition obtained from this example, the viscosity at the time kneading was raised extremely compared to Example 1, as a result, it was impossible to manufacture.

Comparative Example 8 is an example in which the content of the constituent unit of the unsaturated monomer having a carboxylic acid group or acid anhydride group in the thermoplastic resin (a) is less than 0.01% by mass. In the resin composition obtained from this example, the abrasion resistance was extremely inferior compared to Example 5.

Comparative Example 7 is an example in which the amount of the inorganic flame-retarder (b) added is less than the lower limit of the present invention. In the resin composition obtained from this example, the flame-retardance was inferior compared to Example 2.

Comparative Example 7 is an example in which the amount of the inorganic flame-retarder (b) added exceeds the upper limit of the present invention. In the resin composition obtained from this example, the tensile elongation and abrasion resistance were extremely inferior compared to Example 9.

INDUSTRIAL APPLICABILITY

The flame-retardant thermoplastic resin composition of the present invention is useful for electric wire covers of wire harnesses for automobiles, connector parts, tapes, covers of electric wires in apparatuses for electrical appliances, covers of power cords, wall papers, films for building materials, sheets, flooring materials and pipes, which require high flame-retardance, flexibility, and heat resistance.

The invention claimed is:

1. A flame-retardant thermoplastic resin composition, comprising a thermoplastic resin (a) and an inorganic flame-retarder (b), the content of the inorganic flame-retarder (b) being 50 to 250 parts by mass with respect to 100 parts by mass of the thermoplastic resin (a), wherein
    the thermoplastic resin (a) includes at least one selected from the group consisting of an α-olefin (co)polymer (a-1) having 2 to 12 carbon atoms, a thermoplastic elastomer (a-2) and a rubber (a-3);
    the α-olefin (co)polymer (a-1) is at least one α-olefin (co) polymer selected from the group consisting of polypropylene homopolymer, polypropylene block copolymer, low-density polyethylene and maleic acid modified ethylene-butene-1 copolymer;
    the thermoplastic resin (a) includes 0.01 to 0.5% by mass of a constituent unit derived from an unsaturated monomer having a carboxylic acid group or acid anhydride group;
    the inorganic flame-retarder (b) includes 40 to 95% by mass of inorganic metal hydrate (b-1) and 5 to 60% by mass of inorganic filler (b-2), the sum of (b-1) and (b-2) being 100% by mass;
    the average particle diameter of the inorganic filler (b-2) is not more than 2 μm and the aspect ratio of the inorganic filler (b-2) is not more than 1.5;
    the inorganic metal hydrate (b-1) is magnesium hydroxide;
    the inorganic filler (b-2) is calcium carbonate; and
    the ratio of magnesium hydroxide content by mass and calcium carbonate content by mass is 1:1 to 3:1.

2. The flame-retardant thermoplastic resin composition according to claim 1, wherein
    the average particle diameter of the inorganic metal hydrate (b-1) is not more than 2 μm.

3. A molded product made of the flame-retardant thermoplastic resin composition according to claim 1.

4. An electric wire comprising a cover made of the flame-retardant thermoplastic resin composition according to claim 1.

* * * * *